United States Patent [19]

Lee et al.

[11] Patent Number: 5,048,673
[45] Date of Patent: Sep. 17, 1991

[54] CARTONING MACHINE

[75] Inventors: Richard G. Lee, Naples, Fla.; Jeremiah F. Collins, Boylston, Mass.

[73] Assignee: Econocorp, Randolph, Mass.

[21] Appl. No.: 534,687

[22] Filed: Jun. 7, 1990

[51] Int. Cl.$^5$ .......................................... B65G 23/38
[52] U.S. Cl. ............................................... 198/832.1
[58] Field of Search .............. 198/832.1, 626.1, 626.5, 198/803.11, 473.1, 725, 726, 731

[56] References Cited

U.S. PATENT DOCUMENTS

| 2,529,777 | 11/1950 | McInnis | 198/832.1 |
| 2,686,588 | 8/1954 | Hoban | 198/832.1 |
| 3,082,859 | 3/1963 | Hagner et al. | 198/832.1 X |
| 3,198,316 | 8/1965 | Bivans | 198/484.1 X |
| 3,376,968 | 4/1968 | Lott | 198/832.1 X |
| 3,571,892 | 3/1971 | Levy | 198/832.1 X |
| 3,996,036 | 12/1976 | Strauss et al. | 198/832.1 X |

FOREIGN PATENT DOCUMENTS

| 0953596 | 12/1956 | Fed. Rep. of Germany | 198/832.1 |
| 1268255 | 11/1986 | U.S.S.R. | 198/832.1 |
| 1362689 | 12/1987 | U.S.S.R. | 198/832.1 |

Primary Examiner—D. Glenn Dayoan
Attorney, Agent, or Firm—Samuels, Gauthier & Stevens

[57] ABSTRACT

A transport system for incrementally advancing cartons in a carton processing machine through a series of work stations spaced along a processing line, the transport system including an endless chain carried by at least two rotatable idler gears, the chain having at least one run parallel to the processing line, arm members spaced along and protruding laterally from the chain, with the arm members along the one run extending across the processing line to contact cartons located therealong, a piston-cylinder unit having a reciprocating piston rod longitudinally movable in opposite directions and a connecting device for selectively connecting the piston rod to the chain during movement of the piston rod in one direction causing the chain and the arm members spaced thereon to be incrementally advanced. The connecting device includes a head assembly carried by the piston rod and defining a longitudinal channel accommodating passage therethrough of the chain, pins on the head assembly and an actuating device for reciprocating the pins transversely with respect to the length of the channel between an engaged position protruding between the links of the chain, and a disengaged position withdrawn from between the links.

5 Claims, 7 Drawing Sheets

CARTONING MACHINE

BACKGROUND OF THE INVENTION

1. Field of the Invention

This invention relates generally to machines for erecting, filling and closing cartons by passing them through work stations spaced along a processing line, and is concerned in particular with an improved transport system for incrementally advancing the cartons from one work station to the next, as well as with an improved tuck and set mechanism for closing the major outer top flaps of such cartons.

2. Description of the Prior Art The transport systems of known prior art cartoning machines include drive motors operating in conjunction with clutches and brakes, or mechanical indexers operating to convert the rotation of motor drive shafts to a desired rotational output, or walking beam arrangements All are mechanically complex and expensive. Those transport systems relying on clutches and brakes are difficult to control, particularly where it is necessary to achieve precise positioning of the cartons at each work station along the processing line. Walking beam arrangements are not easily adaptable to the processing of different carton sizes.

The tuck and set mechanisms of the prior art cartoning machines are also unduly complex, usually entailing separate operations at separate work stations. Here again, this contributes to higher costs and operational complexities.

SUMMARY OF THE INVENTION

A major objective of the present invention is the provision of an improved transport system for incrementally advancing cartons from one work station to the next along the processing line of a cartoning machine.

Another objective of the present invention is the provision of a transport system which is mechanically simpler and less expensive than known prior art systems.

A further objective of the present invention is the provision of a transport system which is readily adaptable to the processing of a wide range of carton sizes.

Still another objective of the present invention is the provision of an improved tuck and set mechanism enabling both operations to be performed while the carton remains stationary at a single work station.

These and other objects and advantages of the present invention will be described in greater detail with reference to the accompanying drawings, wherein:

DETAILED DESCRIPTION OF ILLUSTRATED EMBODIMENT

A typical carton of the type processed on a cartoning machine is shown at 10 in FIGS. 1A-1F. The carton is in a collapsed state in FIG. 1A. Carton 10 includes a front panel $10_a$, a back panel $10_b$ and side panels $10_c$, $10_d$. Bottom dust flaps $10_e$, $10_f$ extend respectively downwardly from fold lines $10_g$ along the bottom edges of the side panels $10_c$, $10_d$. A major inner flap $10_h$ extends downwardly from a fold line $10_i$ at the bottom edge of rear panel $10_b$, and a major outer flap $10_j$ likewise extends downwardly from a fold line $10_k$ along the bottom edge of front panel $10_a$.

Figures 1A, 1B, 1C:
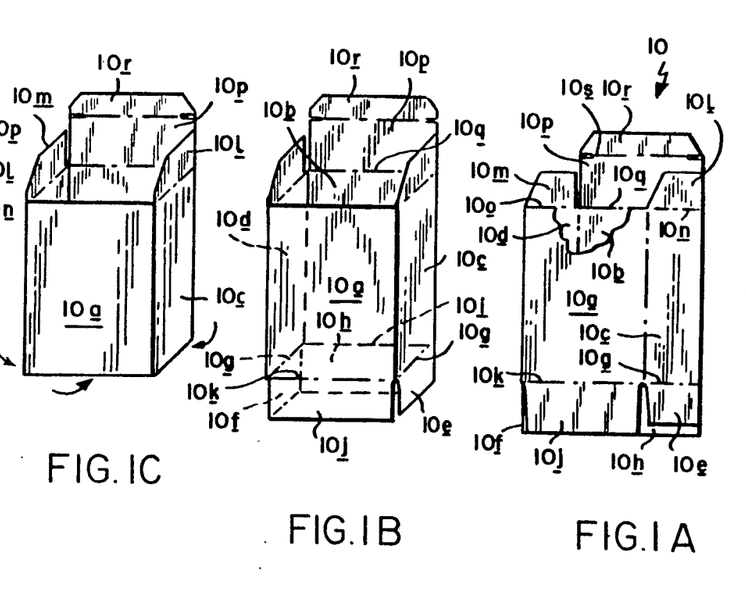
FIGS. 1A-1F are views depicting the stages through which a typical carton is processed on a cartoning machine of the type with which the present invention may be employed.

Top dust flaps $10_l$, $10_m$ extend respectively upwardly from fold lines $10_n$, $10_o$ at the top edges of side panels $10_c$, $10_d$. A major outer flap $10_p$ extends upwardly from a fold line $10_q$ along the top edge of rear panel $10_b$. A tuck tab $10_r$ extends from a fold line $10_s$ at the outer edge of major outer flap $10_p$.

Figure 2:
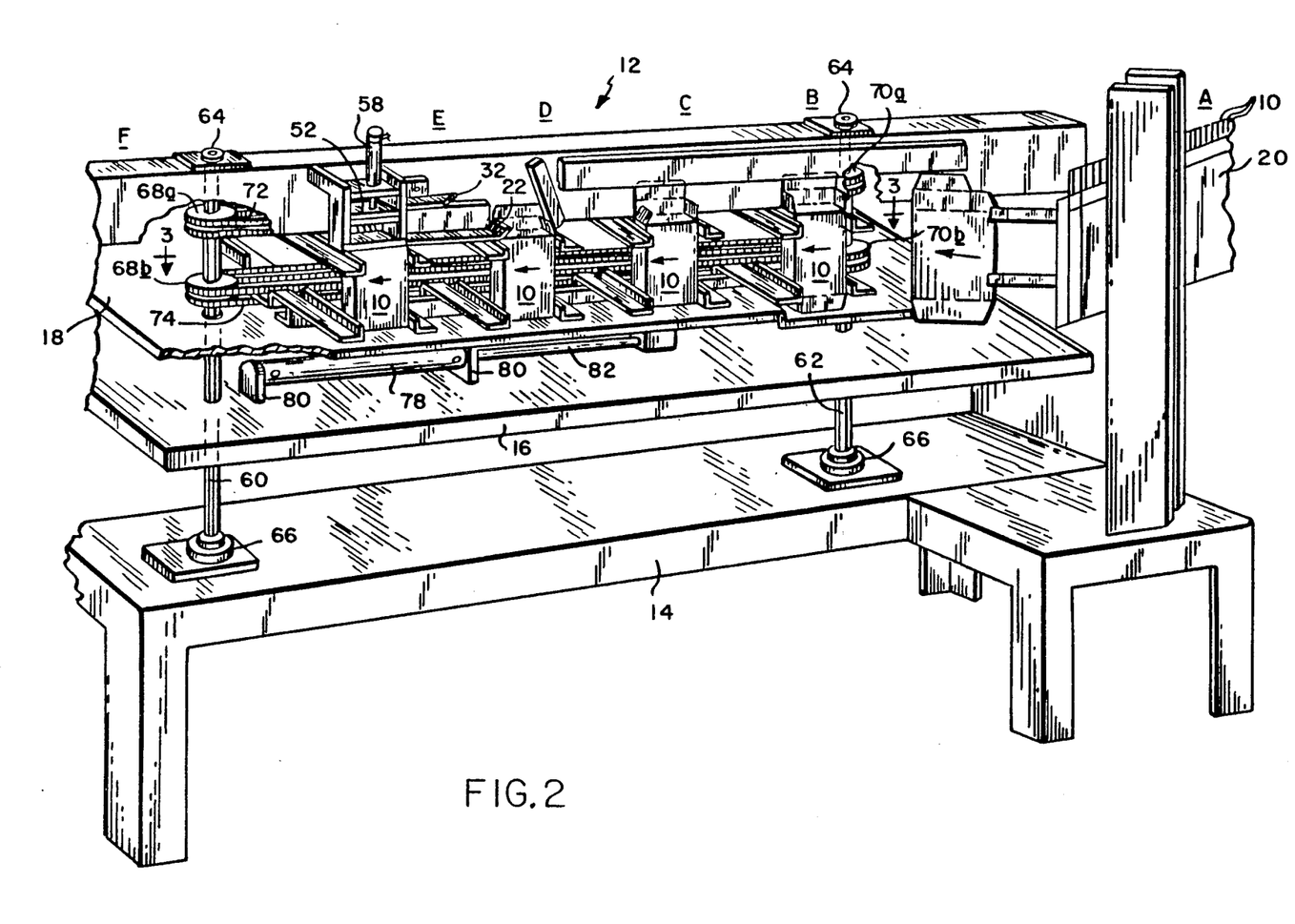
FIG. 2 is a perspective view, with portions broken away, of a cartoning machine incorporating a transport system and a tuck and set mechanism in accordance with the present invention.
Figure 3:
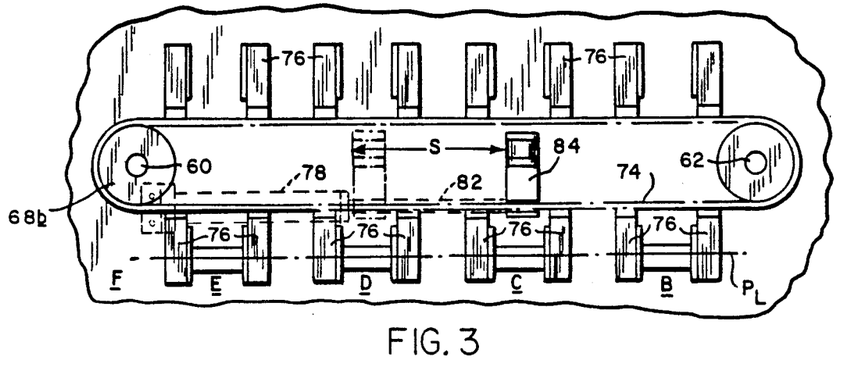
FIG. 3 is a horizontal sectional view taken along line 3—3 of FIG. 2.
Figure 4:
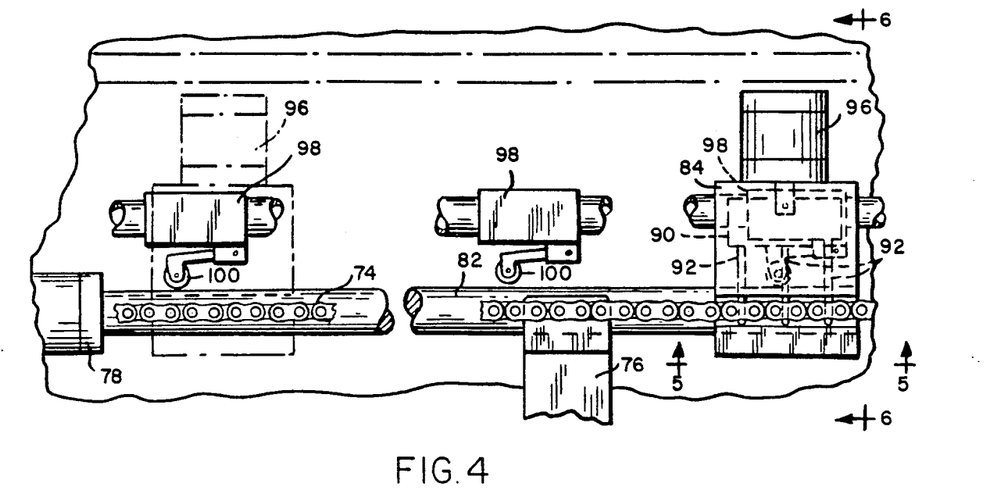
FIG. 4 is an enlarged view of a portion of FIG. 3.
Figure 5:
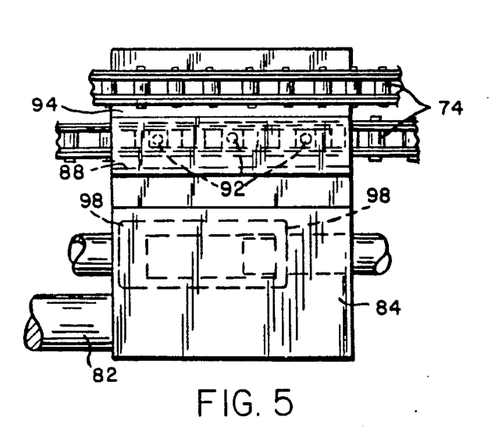
FIG. 5 is a side elevational view taken on line 5—5 of FIG. 4.

Referring now to FIG. 2, a cartoning machine is generally depicted at 12 as comprising a base structure 14 having a base plate 16 and a table 18 underlying a processing line diagrammatically depicted at $P_L$ in FIG. 3. A magazine 20 holds a stack of collapsed cartons 10 at an erecting station A located adjacent to the start of the processing line $P_L$. Stations B-F are spaced along the processing line $P_L$. Cartons are transferred individually from station A to station B where they arrive in an erected form as illustrated in FIG. 1B, with the front, back and side panels, $10_a$, $10_b$ and $10_c$, $10_d$ arranged in an open ended tubular form, and with the flaps at the top and bottom extending upwardly and downwardly in coplanar relationship with their respective panels.

As each carton is advanced to station C, the bottom dust flaps $10_e$, $10_f$ are folded inwardly about their respective fold lines $10_g$, the major inner flap $10_h$ is folded inwardly about its fold line $10_i$, and finally the major outer flap $10_j$ is folded about its fold line $10_k$ and glued to the exterior surface of the major inner flap $10_h$, thereby closing the bottom of the carton, as shown in FIG. 1C. At this point, the carton may be filled at station C through its open top end.

Figure 1D:
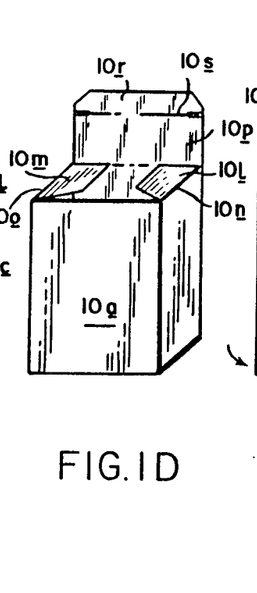

This having been accomplished, the carton is advance to station D where the upper dust flaps $10_l$, $10_m$ are folded inwardly about their respective fold lines $10_n$, $10_o$ as a preliminary step to finally closing the carton top. FIG. 1D shows the condition of the container as it emerges from station D.

Figures 1E, 1F:
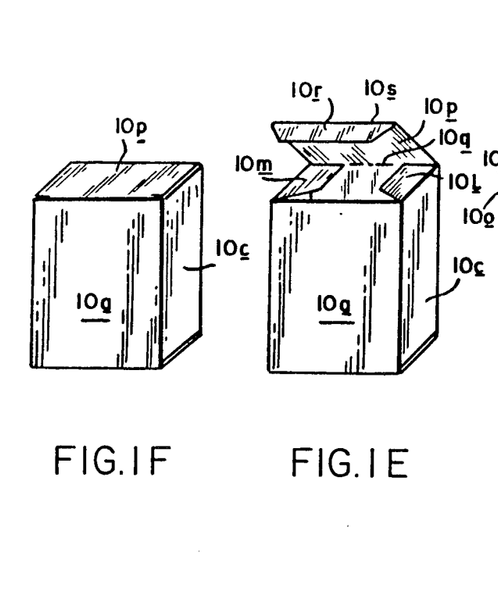

From station D, the carton is advanced to station E where final closure of the top is achieved by initially folding the tuck tab $10_r$ about its fold line $10_s$, and then folding the major outer flap $10_p$ downwardly about its fold line $10_q$ to insert and set the tuck tab behind the top edge of the front panel $10_a$, as shown in FIG. 1F. The fully closed carton is then ejected from the machine.

With the exception of the means employed at station E to achieve final closure of the container by folding the upper major flap $10_p$ and tucking and setting tab $10_r$, the mechanisms used to extract cartons from the magazine A and to fold and glue the other carton flaps at stations B–D are conventional and well understood by those skilled in the art. Thus, only the folding, tucking and setting features of station E will now be described in further detail.

With reference to FIGS. 8–11, it will be seen that as a carton is advance towards station E, the lead upper dust flap $10_m$ encounters an inclined lip 22 on a guide plate 24 extending along the bottom of a support plate 26, the latter being attached to a support beam 28 paralleling the processing line $P_L$. Plate 20 is spaced from beam 28 by an intermediate spacer plate 30. The dust flap $10_m$ is folded downwardly beneath plate 24 as the upstanding major panel $10_p$ passes behind plate 26. As the carton progresses towards station E, the tuck flap $10_r$ encounters the edge of another plate 32 parallel to plate 24. Plate 32 causes tuck flap $10_r$ to be bent inwardly about its fold line $10_s$ as the carton enters station E.

Figure 8:
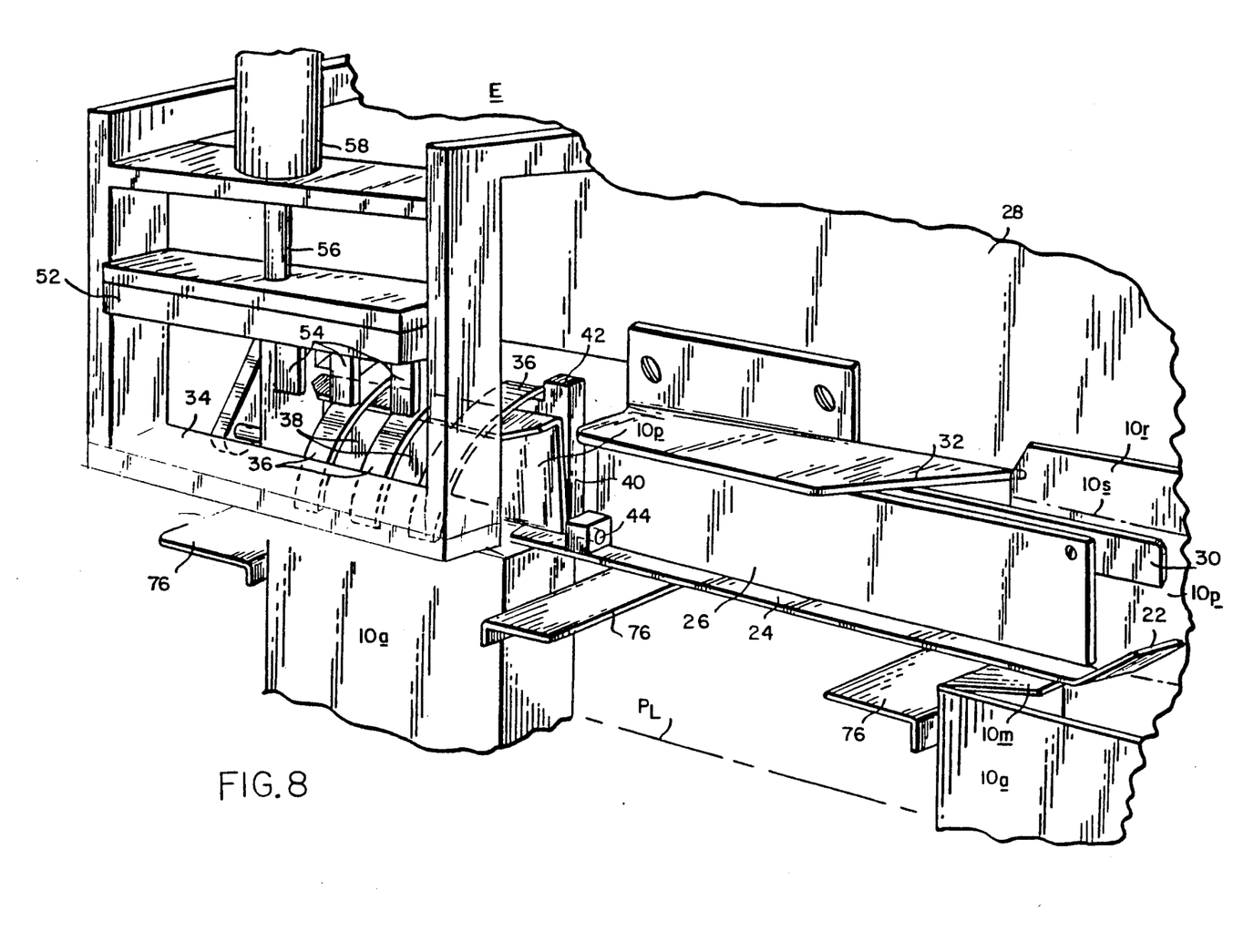
FIG. 8 is an enlarged partial perspective view of the tuck and set mechanism.

Station E includes a plate 34 supporting cantilevered curved guide strips 36 spaced one from the other to define arcuate slots 38. A folder plate 40 having fingers 42 aligned with the slots 38 is mounted on a shaft 44 for rotational movement about its axis A crank 46 is fixed at its lower end to shaft 44, and is pivotally connected at its upper end as at 48 to the piston rod 50 of a horizontally disposed piston-cylinder unit (not shown).

A slide 52 is mounted for vertical movement above and in relation to the plate 34 The slide has depending fingers 54 aligned with the slots 38. The piston rod 56 of a vertically disposed piston-cylinder unit 58 is connected to the slide.

Figure 9:
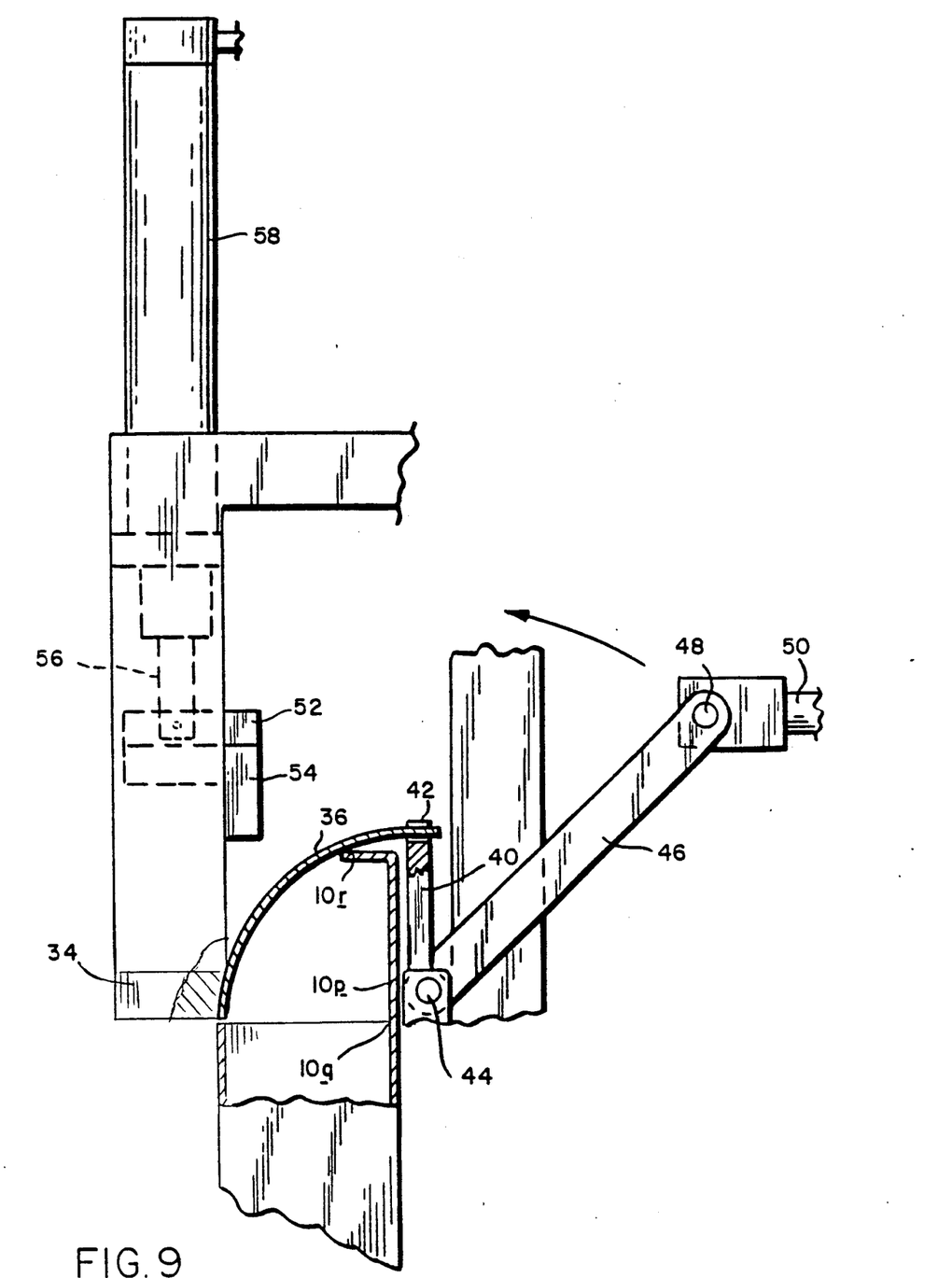
FIGS. 9-11 are sectional views depiction sequential operational stages of the tuck and set mechanism.
Figure 10:
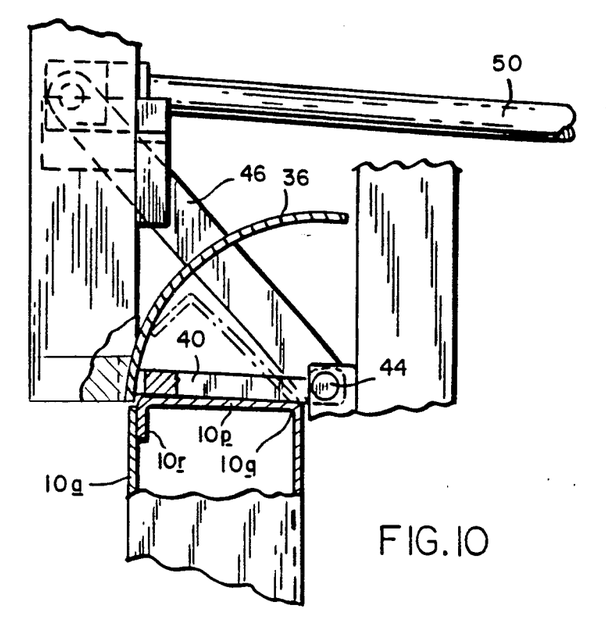
Figure 11:
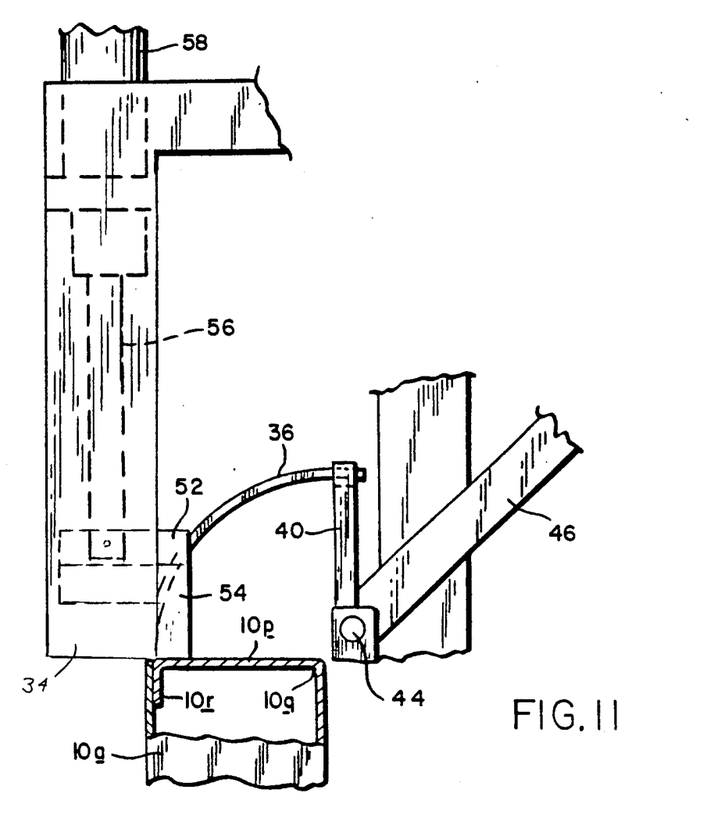

As shown in FIG. 9, when the container arrives at station E, the major flap $10_p$ and the pre-bent tuck tab $10_r$ lie beneath the curved guide strips 36. As illustrated in FIG. 10, the piston rod 50 is then extended to rotate crank 46, thereby rotating shaft 44 and causing the folder plate 40 to rotate correspondingly, which in turn causes fingers 42 to traverse the slots 38, thereby folding the upper flap $10_p$ about its fold line $10_q$ and partially inserting the tuck tab $10_r$ behind the carton front panel $10_a$. During this downward folding of the flap $10_p$, the pre-bent tuck tab $10_r$ is guided along the undersides of the curved strips 36. The folder plate 40 is then returned to its original position, after which as shown in FIG. 11, the vertical piston-cylinder unit 58 is actuated to lower the slide 52, causing its fingers 54 to project through the slots 38 and to push the upper flap $10_p$ downwardly, thereby setting the tuck tab $10_r$ behind the front panel $10_a$. This having been accomplished, the slide 52 is returned to its original position. The carton top is thus securely closed before the container is advanced from station E to station F for discharge from the machine.

The transport system for incrementally advancing cartons along the processing line $P_L$ from station B to station F will now be described with additional reference to FIGS. 3 to 6. Shafts 60, 62 extend vertically through the machine 12, with their upper and lower ends respectively journalled for rotation in bearings 64, 66 carried on the support beam 28 and the base structure 14. Shaft 60 carries upper and lower toothed sprocket wheels $68_a$, $68_b$, and shaft 62 likewise carries a mating pair of upper end lower toothed sprocket wheels $70_a$, $70_b$. Upper and lower endless dual chains 72, 74 are trained respectively around sprocket pairs $68_a$, $70_a$ and $68_b$, $70_b$. The chains 72, 74 respectively have front and rear runs extending in parallel relationship with the processing line $P_L$.

Pairs of arms 76 are detachably secured to the chains 72, 74 at spaced intervals along the lengths thereof The arms 76 protrude laterally from the chains, with the pairs of arms along the front runs extending across the processing line $P_L$ to grip cartons therebetween.

A piston-cylinder unit 78 is mounted by brackets 80 on table 16. The piston rod 82 of unit 78 carries a head assembly 84. Actuation of piston-cylinder unit 78 reciprocates piston rod 82 and the head assembly 84 carried thereon in opposite direction parallel to the processing line $P_L$. The stroke of piston rod 82 is indicated at S in FIG. 3.

Figure 6:
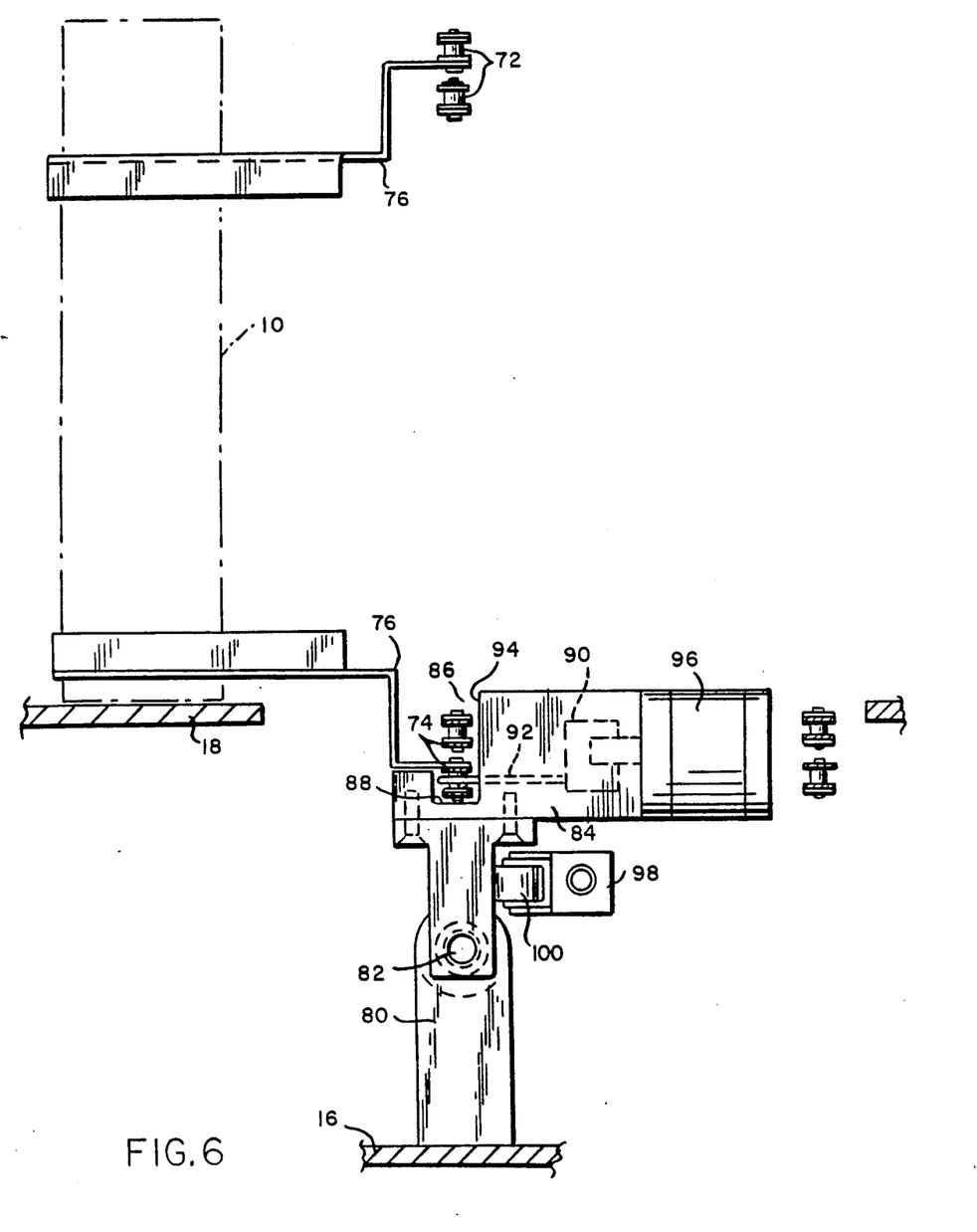
FIG. 6 is an enlarged sectional view taken along line 6—6 of FIG. 4.

The head assembly 84 is notched as at 86, and a channel 88 is formed at the base of the notch. The front run of chain 74 traverses the notch 86, and its bottom portion extends through and is laterally confined within channel 88. The head assembly is internally configured to contain a slide 90 having pins 92 protruding therefrom through openings in the side 94 of notch 86. The slide 90 is reciprocated in a direction perpendicular to the process line $P_L$ and the front run of chain 74 by a piston-cylinder unit 96 carried on the head assembly 84. The piston-cylinder unit 96 operates to reciprocate the slide 90 and thus adjust the pins 92 between engaged positions extending between the articulately connected links of chain 74 as shown in FIGS. 3 and 6, and disengaged positions withdrawn therefrom When thus engaged, the pins 92 establish a mechanical connection via the head assembly 84 between the piston rod 82 and the front run of chain 74.

When advancing cartons along the processing line $P_L$, the piston rod 82 is first extended with the pins 92 disengaged from the front run of chain 74. Piston-cylinder unit 96 is then actuated to shift the pins to their engaged positions The piston rod 82 is then retracted through its stroke S, causing the chain 74 to be correspondingly indexed, with a corresponding indexing of the shafts 60, 62, which in turn produces the same indexing of upper chain 72. The cartons gripped between pairs of arms 76 are thus incrementally advanced along processing line $P_L$ through the same distance S, which corresponds to the spacings between the work stations B–F.

The incremental movement of the cartons is extremely precise. Air switches 98 having rollers 100 actuated by contact with the head assembly 84, may be employed to control actuation of the piston-cylinder units 78 and 96. The arms 76 may easily be repositioned along the chains 72, 74 to accommodate different sized containers.

Figure 7:
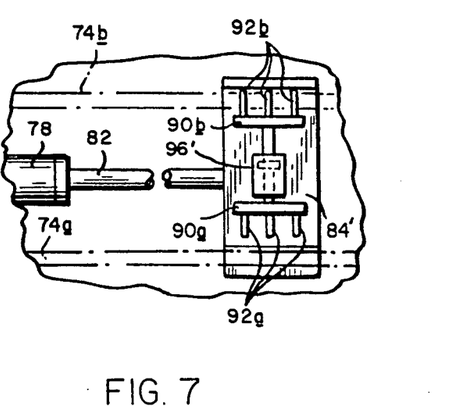
FIG. 7 is a partial view illustrating an alternate embodiment of the transport system.

FIG. 7 illustrates an alternate embodiment of the invention where the head assembly 84' has two slides $90_a$, $90_b$ operated by a common double acting piston-cylinder unit 96, interposed therebetween. With this arrangement, the pins $92_b$ of slide $90_b$ may be engaged with the links of the rear chain run $74_b$ during movement of the piston rod in one direction, and prior to shifting the piston rod 82 in the reverse direction, the pins $92_b$ can be retracted from between the links of rear chain run $74_b$ while engaging the pins $92_a$ of slide $90_a$ between the links of the front chain run $74_a$. Thus, incremental chain movement can be realized during each directional shifting of the piston rod 82.

In light of the foregoing, it will now be appreciated by those skilled in the art that the carton transport system of the present invention offers numerous significant advantages as compared to prior art systems. Repetitive incremental indexing without having to resort to the use of expensive and complicated brakes, clutches and the like. The system is easily adaptable to different carton sizes by simply readjusting the positions of the transport arms 76 on their respective chains. Additional advantages are realized as a result of the improved tuck and inset mechanism at station E, which completes both operations at a single location.

Changes and modifications may be made to the above-described embodiments without departing from the spirit and scope of the invention as defined by the appended claims. For example, flexible elements such as straps or belts may be employed in place of the chains 72, 74. Engagement devices such as grippers or the like may be substituted for the pins 92. Additional shafts and pulleys or toothed wheels may be used to reorient the runs of the flexible drive elements in order to suit differently configured machines.

We claim:

1. In a machine for processing cartons through a series of work stations spaced along a processing line, a transport system for incrementally advancing said cartons along said line from one work station to the next, said system comprising:
- an endless chain carried by and extending between at least two rotatable idler gears, said chain consisting of articulately interconnected links and having at least one run parallel to said processing line;
- arm members spaced along and protruding laterally from said chain, with the arm members along said one run extending across said processing line to contact cartons located therealong;
- a piston-cylinder unit having a reciprocating piston rod longitudinally movable in opposite directions; and
- connecting means for selectively connecting said piston rod to said chain during movement of said piston rod in one direction, thereby causing said chain and the arm members spaced thereon to be incrementally advanced with a corresponding incremental advancement along said processing line of cartons contacted by said arm members, said connecting means comprising a head assembly carried by said piston rod and defining a longitudinal channel accommodating passage therethrough of said chain, pin members on said head assembly, and actuating means for reciprocating said pin means transversely with respect to the length of said channel between an engaged position protruding between links of said chain, and a disengaged position withdrawn from between said links.

2. The transport system of claim 1 wherein said actuating means comprises a second piston-cylinder unit having a second piston rod operatively connected to said pin means.

3. The transport system of any one of claims 1 wherein the reciprocating motion of the piston rod of said first mentioned piston-cylinder unit occurs in opposite directions parallel to said one run.

4. The transport system of claim 1 wherein said chain extends around a manually spaced pair of said gears to thereby define first and second runs extending in parallel relationship to said processing path.

5. The transport system of claim 4 wherein said head assembly is interposed between said two runs, and said actuating means for reciprocating said pin means alternatively between first and second settings protruding respectively between the links of said first and second runs.

* * * * *